(No Model.) 2 Sheets—Sheet 1.

J. URBANEK.
CORN PLANTER.

No. 544,939. Patented Aug. 20, 1895.

WITNESSES:
Chas. Nida
Fred Acker

INVENTOR
J. Urbanek
BY
Munn & Co.
ATTORNEYS.

(No Model.) 2 Sheets—Sheet 2.

J. URBANEK.
CORN PLANTER.

No. 544,939. Patented Aug. 20, 1895.

WITNESSES:
Chas Nide
Fred Acker

INVENTOR
J. Urbanek
BY
Munn & Co
ATTORNEYS.

UNITED STATES PATENT OFFICE.

JOSEPH URBANEK, OF SCHUYLER, NEBRASKA.

CORN-PLANTER.

SPECIFICATION forming part of Letters Patent No. 544,939, dated August 20, 1895.

Application filed April 23, 1895. Serial No. 546,905. (No model.)

*To all whom it may concern:*

Be it known that I, JOSEPH URBANEK, of Schuyler, in the county of Colfax and State of Nebraska, have invented a new and Improved Corn-Planter, of which the following is a full, clear, and exact description.

My invention relates to an improvement in planters, especially to an improvement in corn-planters; and it has for its object to provide a simple and positive movement for the seed-drop slide or whatever equivalent thereof may be employed, and, furthermore, to provide markers which will act automatically and regularly and a means whereby the markers may be set as desired.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
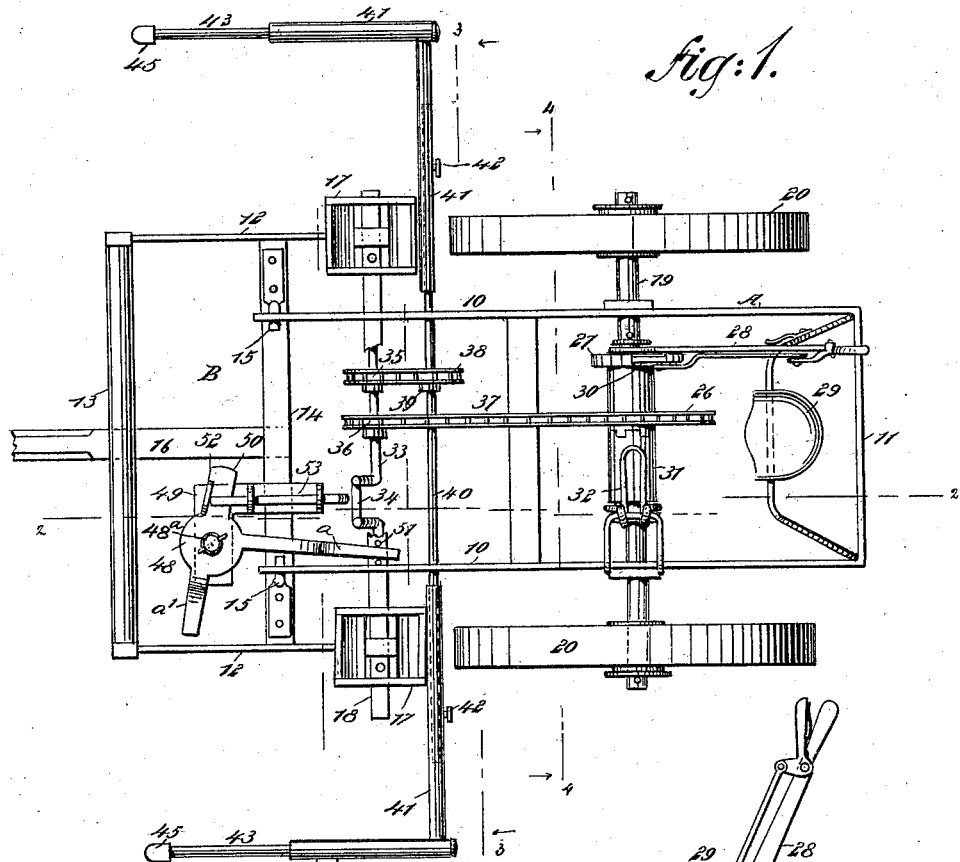
Figure 2:
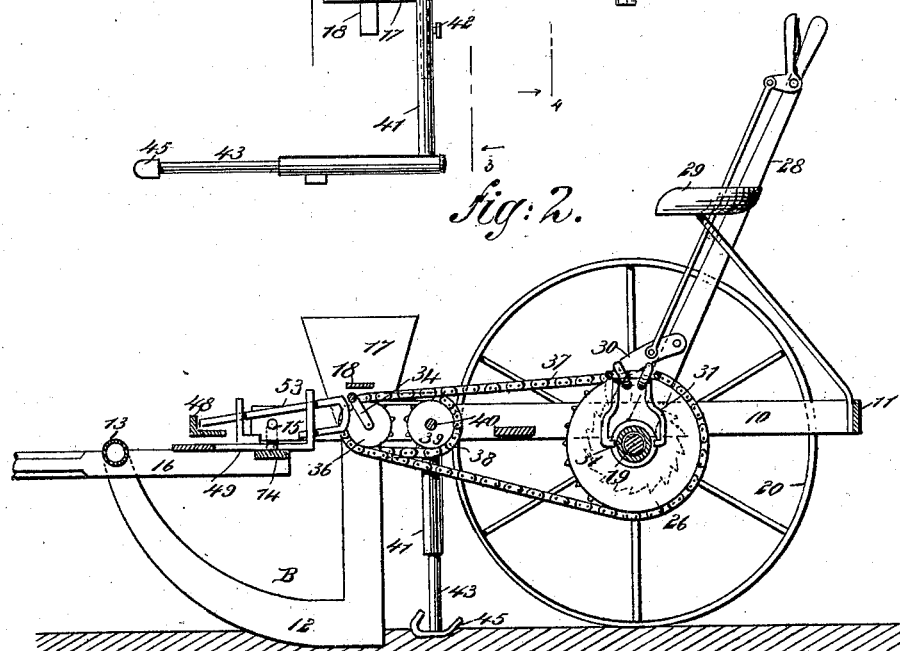
Figure 3:
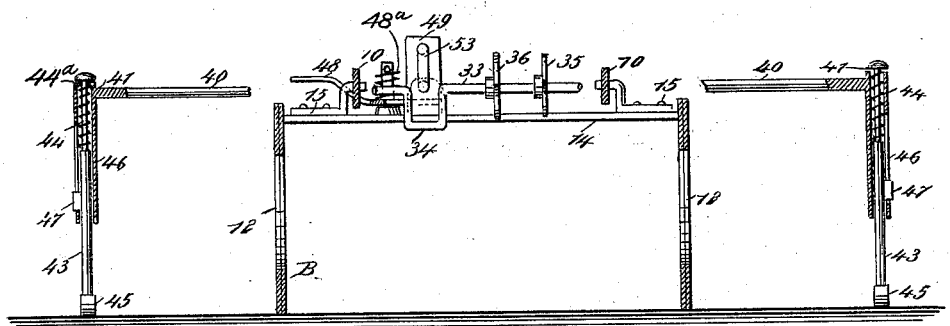
Figure 5:
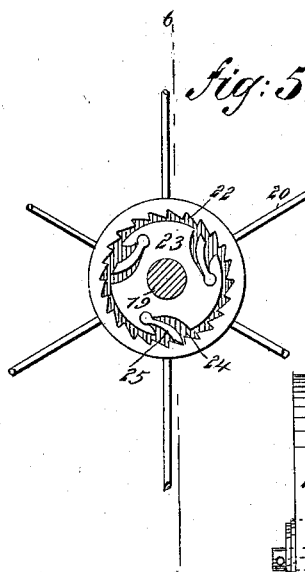
Figure 4:
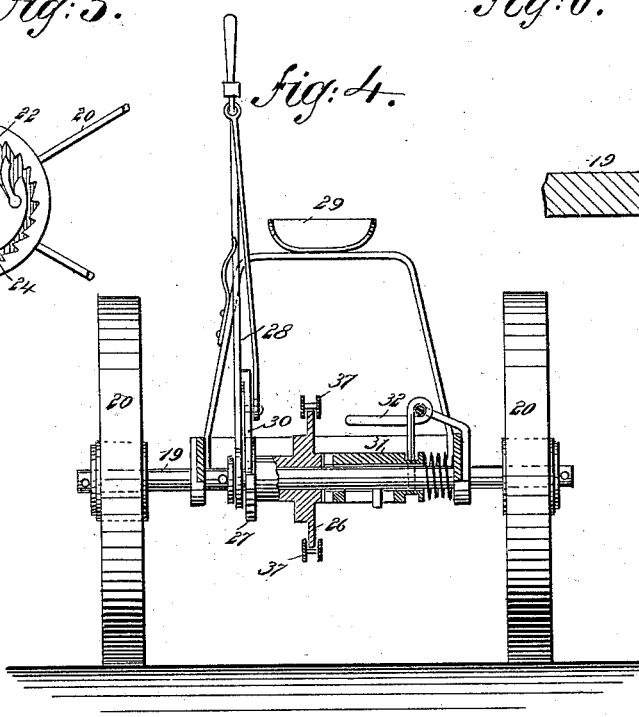
Figure 6:
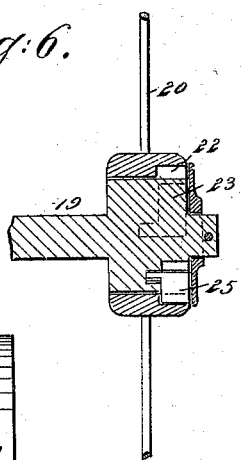

Figure 1 is a plan view of the planter. Fig. 2 is a longitudinal vertical section on the line 2 2 of Fig. 1. Fig. 3 is a transverse section taken on the line 3 3 of Fig. 1. Fig. 4 is a transverse section on the line 4 4 of Fig. 1, and Figs. 5 and 6 are detail views of the clutch mechanism whereby the ground-wheels serve to turn the axles on which they are mounted.

In carrying out the invention the frame A comprises usually two side bars 10 and a rear end bar 11, and the forward end of the frame is made to rest on a sled B, comprising the usual shoes or runners 12, connected at the top by a front bar 13 and a rear bar 14, the main frame A being pivoted to the sled-frame by passing brackets 15 or their equivalents loosely through the forward ends of the side bars of the said main frame, as shown in Fig. 1. The tongue 16 is secured to the sled-section of the frame in any suitable or approved manner, and this section of the frame is likewise provided with seed-boxes 17, the seed being dropped therefrom through the medium of a slide 18 held to reciprocate transversely of the frame.

The axle 19 is journaled in the main frame A, and is provided with a ground-wheel 20 at each end. These ground-wheels have a ratchet-and-pawl connection with the axle, and said ratchet-and-pawl connection is preferably that shown in Figs. 5 and 6, in which it will be observed that the hub of the wheel is provided with an interior enlarged chamber upon its outer face, having ratchet-teeth 22 formed upon its peripheral wall, and a block 23 is secured upon the axle, being adapted to revolve within the hub-chamber, and this block is provided with a number of recesses 24 in its periphery, receiving and pivoting pawls 25, the latter engaging with the teeth of the hub when the wheel is turned in a forwardly direction, so that the axle will turn with the wheels, but when the machine is backed the pawls simply slip over the teeth.

A large gear-wheel, preferably a sprocket-wheel 26, is loosely mounted on the axle, and the hub of the said wheel is provided at one end with a clutch-face and at its opposite end with a ratchet-wheel 27, while adjacent to this ratchet a hand-lever 28 is loosely mounted on the axle, having a suitable hand-latch and means for locking it. This lever is convenient to the driver's seat 29, and is provided with an attached dog 30, engaging with the teeth of the ratchet-wheel, so that the large driving-wheel 26 may be turned while the machine is standing still to adjust the markers, which latter will be hereinafter described.

The driving-wheel is made to turn with the axle through the medium of a clutch 31, mounted to slide upon and turn with the axle, and operated preferably through the medium of a shifting foot-lever 32, placed convenient to the driver's seat, as shown in Figs. 1 and 4. A shaft 33 is journaled in the forward portion of the main frame, and this shaft is provided with a crank-arm 34 and has two sprocket-wheels 35 and 36 secured thereon, the sprocket-wheel 36 being connected with the large driving-wheel 26 through the medium of a link belt 37, while the sprocket-wheel 35 is connected by a belt 38 with a similar wheel 39, mounted upon a marker-shaft 40, and this shaft is journaled in the main frame between the axle and crank-shaft, and extends a predetermined distance beyond the sides of the frame.

Each end of the marker-shaft 40 has loosely fitted thereon an angular or substantially L-shaped sleeve 41, the horizontal member of each sleeve being adjustable on the marker-shaft through the medium of a set-screw 42, or the equivalent thereof. A marking-arm 43 is held to slide in the vertical member of each marking-sleeve 41, being cushioned by a spring 44, the spring having a tendency to force the arm downward, and each marking-arm is made to terminate at its lower end in a shoe 45, of somewhat rocker-like construction, and the member of the sleeve in which the arm has sliding movement is provided with a slot 46, (shown in Fig. 3,) and the arm with a stop 47 entering the said slot and limiting the movement of the arm to which it is secured. The inner end of the sleeve 41 is provided with a flange $44^a$, which holds the spring 44 in place. Thus it will be observed that as the machine advances the marking-shaft will be given rotary motion and the marking-shoes at each downward stroke will produce a mark in the ground.

The seed drop-slide is reciprocated through the medium of an angle-lever 48, fulcrumed upon a bracket 49, secured to the sled-section of the frame. This angle-lever is provided with a spring $48^a$ and with a lip 50, extending inwardly from the body portion or the point of junction between its members. One member $a$ of this angle-lever is made to pass between studs 51 located on the drop-slide, as shown best in Fig. 1, while the other member $a'$ may be used for attachment to other forms of slides than that shown. The lever, as illustrated, virtually comprises the longer member $a$ and the lip 50, the latter being provided with an extension 52 from its upper edge.

A bolt 53 is mounted to slide upon the bracket upon which the angle-lever is mounted, and the spring $48^a$, connected with the angle-lever, will normally hold the extension 52 of the lip against the forward end of this bolt, the rear end of the bolt being enlarged or bent or otherwise shaped so that it may be struck by the crank-arm 34 of the shaft 33 as said shaft is revolved.

$48^a$ indicates a coil-spring which is of the torsional class, and which is arranged to embrace the axis of lever 48, and is connected to said axis and lever in a way which will give the lever a tendency to the left. Therefore in the operation of the machine when the driving-gear 26 is rotated from the axle 19 the lever 48 will be intermittently reciprocated or rocked by the crank-arm 34 striking the bolt 53 and forcing the lip portion of the said lever in a forwardly direction, carrying the longer member of the lever in an inwardly direction, and as soon as the bolt is released from the crank-arm 34 the spring $48^a$, controlling the lever 48, will return the drop-slide in an opposite direction by the return movement of the lever, which movement will likewise carry the bolt 53 in position to be struck at the next return of the crank-arm. At the same time the marking-shaft 40 will have been rotated to cause the markers to indicate by depressions in the ground the planting of each hill.

It is evident that by carrying the clutch 31 out of engagement with the driving-wheel the latter, through the medium of the hand-lever 28, may be adjusted to bring the markers into tally relation to the dropping arrangement of the seed-boxes.

Having thus described my invention, I claim as new and desire to secure by Letters Patent—

1. In a seed planter, the combination of slide dropping mechanism, a spring-controlled lever connected to said mechanism, a reciprocal bolt, and means for periodically moving the same, substantially as described.

2. In a seed planter, the combination of seed dropping mechanism, a spring-controlled lever having a connection therewith, a reciprocal bolt capable of engaging the lever, and means for periodically operating the bolt, substantially as described.

3. In a seed planter, the combination of seed dropping mechanism, a bent and spring-controlled lever having one arm connected to said mechanism and having a projection on the other arm, a reciprocal bolt capable of engaging the projection, and means for periodically operating the bolt, substantially as described.

4. In a seed planter, the combination of seed dropping mechanism, a spring-controlled lever connected to said mechanism, a reciprocal bolt capable of engaging the lever, a rotary and driven shaft, and a double crank formed on the shaft and for periodically operating the bolt, substantially as described.

5. In a seed planter, the combination of slide dropping mechanism, a spring-controlled and bent lever having one arm connected to the mechanism and having a projection on the remaining arm, a reciprocal bolt, a rotary and driven shaft, and a double crank on the shaft and capable of periodically operating the bolt, substantially as described.

6. In a seed planter, the combination of dropping mechanism, a spring-controlled lever connected to the mechanism, a reciprocal bolt, a rotary shaft, a double crank thereon and capable of periodically operating the bolt, a second shaft parallel with the first shaft and geared therewith, and a marker at each end of the shaft, substantially as described.

7. A marker for seed planting machines, consisting of a rotary shaft, a sleeve extending at right angles thereto and longitudinally slotted, a marker rod movable longitudinally within the sleeve and having a stud projecting through a slot therein, and a spring for pressing the rod outwardly, substantially as described.

JOSEPH URBANEK.

Witnesses:
F. W. WHITMAN,
VACLAV METELAK.